United States Patent [19]
Hartman et al.

[11] 3,709,699
[45] Jan. 9, 1973

[54] METHOD OF PREPARING A POULTRY PRODUCT

[76] Inventors: Robert H. Hartman, 10129 Huntington Court, Orland Park, Ill. 60462; Eldon J. Strandline, 6531 North Minnehaha Avenue, Chicago, Ill. 60646

[22] Filed: Jan. 25, 1971

[21] Appl. No.: 109,685

[52] U.S. Cl. .................... 99/107, 99/169, 99/194
[51] Int. Cl. .................................. A22c 21/00
[58] Field of Search .............. 99/107, 108, 169, 194

[56] References Cited

UNITED STATES PATENTS

| | | |
|---|---|---|
| 2,910,370 | 10/1959 | Rogers et al .......................... 99/194 |
| 2,922,718 | 1/1960 | Saverslak ............................. 99/107 |
| 3,166,427 | 1/1965 | Herrmann ............................ 99/194 |
| 3,192,051 | 6/1965 | Wendt et al. ......................... 99/107 |
| 3,503,755 | 3/1970 | McGowan ............................. 99/107 |

*Primary Examiner*—Hyman Lord
*Attorney*—Edward T. McCabe, Charles E. Bouton and Robert E. Blankenbaker

[57] ABSTRACT

A synthetic poultry skin is formulated by comminuting poultry skin tissue, and mixing the comminuted tissue with a binder material. The synthetic skin formulation is then blended with water to form a paste and applied to poultry meat to give a poultry product having a synthetic skin.

10 Claims, No Drawings

METHOD OF PREPARING A POULTRY PRODUCT

Generally, the present invention relates to an improved method for preparing poultry products. More particularly, the present invention relates to a method for coating a poultry product with a synthetic skin prepared from comminuted poultry skin tissue combined with a suitable binding material.

Poultry skin is utilized to cover the surfaces of many poultry products such as poultry roasts, poultry loaves, poultry rolls and poultry logs. Also, poultry skin is applied to the surface of certain gourmet items such as breasts of turkey and chicken. Examples of poultry products which are enwrapped in an outer coating of whole poultry skin include the products disclosed in U.S. Pat. No. 2,267,442; 2,633,601; 2,922,718; 3,036,922; 3,192,051; and 3,166,427. This natural skin is removed from the poultry during processing to obtain the poultry meat. Operators then trim the flesh and fat from the skin and cut the skin to size in order that it be of suitable dimensions to cover the poultry meat product. This natural skin covering gives good appearance to the product and decreases moisture evaporation during freezer storage and subsequent cooking of the finished product. The natural skin browns to a good color during the cooking process, and provides flavor and aroma to the poultry product.

The primary drawback to the prior art use of poultry skin in covering poultry products is the waste of such skin involved in cutting it to size to cover a particular product. Much of the skin becomes left over scrap and must be discarded. Moreover, the fatty tissue and flesh adhering to the skin upon removal of the skin from the fowl is trimmed and discarded, thus resulting in further waste of poultry raw material. It would thus be a significant advance in the poultry art to develop an improved method for utilizing all of the poultry skin tissue in preparing a skin covering for poultry products.

It is accordingly a principal object of the present invention to provide an improved method for coating poultry meat products.

It is another object of the present invention to provide an improved method for inexpensively preparing a poultry skin substitute to be used in wrapping poultry roasts.

It is also an object of the present invention to provide a method for preparing synthetic poultry skin by combining comminuted poultry skin tissue with a suitable binder agent.

Generally, the present invention is carried out by formulating a synthetic poultry skin comprising comminuted poultry skin tissue and a suitable binder material, along with optional added ingredients. This formulation may then be combined with a suitable amount of water to give a skin material having a paste-like consistency which can be applied to the outside surface of poultry meat products.

In practicing the method of this invention, a fowl such as turkey is slaughtered, dressed, chilled and boned in a conventional manner. The skin is removed from the fowl along with the layer of fat and flesh normally adhering thereto. For the purpose of describing this invention, the poultry skin, along with its normally adhering fat and flesh, will be jointly referred to as either poultry skin tissue or untrimmed poultry skin. The terminology "synthetic poultry skin" or "synthetic skin" as used in the description of this invention refers to an artificial skin covering which has been fabricated to imitate or replace real poultry skin. The synthetic skin, however, contains real poultry skin as one constituent thereof. Also, "synthetic skin formulation" will refer to the skin/binder mixture prior to blending with water.

The poultry skin tissue is comminuted to a very fine texture in a suitable comminuting device such as a cut mix or a food chopper. The poultry skin tissue may be cooked prior to comminution. However, best results are obtained using raw poultry skin tissue. The skin tissue is comminuted at temperatures below about 50° F. It is preferred to comminute at a temperature of from about 28° F. to about 32° F. inasmuch as the tissue is firm at this temperature and the comminution is more efficient. The untrimmed poultry skin may be chilled to 28° F. to 32° F., or in the alternative, frozen skin tissue can be thawed to a temperature of 28° F. to 32° F. Dry ice can be added during the comminution step to maintain the 28° F. to 32° F. temperature.

The comminuted poultry skin tissue is then mixed with one or more binding materials. Suitable binding agents include sodium caseinate, cereals (wheat, rye, oats, barley, rice, maize), gelatin, milk solids, liquid egg whites (albumen), flour such as potato flour and wheat flour, starches such as cornstarch, comminuted meat proteins, vegetable gums such as carboxymethyl cellulose, methyl cellulose, locust bean gum and guar gum, and mixtures thereof. Usually the comminuted tissue will be blended with more than one binding agent, for example sodium caseinate and flour, or gelatin and liquid egg whites. It has been discovered that a suitable synthetic skin formulation can be prepared by mixing a composition containing from about 50 percent to about 95 percent comminuted poultry skin tissue by weight, and from about 5 percent to about 50 percent binder materials by weight. A more preferred range of ingredients is from about 70 percent to about 95 percent comminuted skin tissue and from about 5 percent to about 30 percent binder material.

Several categories of optional ingredients may be advantageously added to the mixture of comminuted skin tissue and binder material. For example, a food grade humectant may be added in order to impart increased moisture retention properties to the final synthetic skin coating. Suitable humectants include propylene glycol, glycerin, sorbitol, corn syrup and various sugars. Humectants will generally comprise less than about 5 percent of the synthetic skin formulation, on a dry weight basis, and preferably from about 1 percent to about 5 percent.

Also, antioxidants may be added to the synthetic skin formulation in order to provide an acceptable shelf-life for the final product by preventing oxidative deterioration of the fat content of the synthetic skin. Suitable antioxidants include butylated hydroxy toluene (BHT), butylated hydroxy anisole (BHA), sodium phosphate, and ethylenediamine tetraacetic acid (EDTA). The amount of antioxidants which may be added is generally regulated by the Federal Food and Drug Administration and is usually less than about 1 percent on a dry weight basis.

Often, other edible materials can be incorporated into the synthetic skin formulation in order to give the skin more body, or to improve appearance and texture of the synthetic skin. Thus bread croutons or bread crumbs may be beneficially employed as a texturizing material. The texturizing material may be present in an amount of up to about 45 percent based on the dry weight of the synthetic skin formulation.

Other ingredients which may be optionally added to the synthetic skin formulation include browning agents which will help impart a desirable color to the synthetic skin upon roasting. Sugars and starches may be included in this group. It should be noted that sugars may also be present as humectants, and that starches may also be present as binding agents. Flavorings and seasonings may be added to impart desired flavors to the synthetic skin. Also, metallic salts such as sodium chloride and metal polyphosphates may be added in small amounts. Finally, various coloring agents may be incorporated into the synthetic skin formulation.

After the comminuted poultry skin tissue has been mixed with the binding materials and any optional ingredients, the resulting formulation may be blended with water in order to obtain a paste-like consistency. The amount of water added is not critical. Thus where moisture is already present due to the addition of egg whites or gelatin solution, water need not be added. Excessive amounts of water may cause an uneven distribution of the skin formulation on the surface of the product, thus causing patchiness and spottiness when the product is cooked. On the other hand, the use of too little water may result in a skin formulation which is too thick and pasty to be easily handled. Generally, the amount of water added to the skin formulation will be sufficient to result in a synthetic skin of paste-like consistency which can be processed through pumps and automated equipment. Thus, the amount of water added to the skin formulation may range from about 0 percent to about 70 percent, and preferably from about 30 percent to about 60 percent, based upon the final weight of the skin paste. That is, the final skin paste will broadly contain from about 0–70 percent water and from about 30–100 percent skin formulation, and preferably, from about 30–60 percent water and from about 40–70 percent skin formulation.

Application of the paste-like synthetic skin material to the poultry product may be carried out by any desired means. For example, the synthetic skin material may be extruded onto the product, or applied by hand utensils, or the product may be rolled in the skin formulation to batter the surface of the meat, or the product may be dipped into the skin formulation to cover the meat surface. The thickness of the skin material on the surface of the meat should range from about three thirty-seconds of an inch to about one-fourth inch, and preferably from about one-eighth inch to about three-sixteenths of an inch.

After the raw poultry product has been covered with a thin coating of the synthetic poultry skin, the product is preferably packaged in a suitable container, e.g., aluminum pan, and immediately frozen. However, this invention also contemplates cooking of the final product immediately after application of the synthetic skin to the meat.

During roasting of the product the binding agents retain the synthetic skin formulation intact on the product surface. After cooking, the synthetic skin has an appearance and texture similar to natural skin.

It should be noted that the synthetic skin material can also be applied as a covering to replace torn, damaged, or cut-out sections of the natural skin of downgraded fowl. Primarily, however, the synthetic skin material is contemplated as an artificial skin coating for poultry roast-type products packaged in aluminum containers.

EXAMPLE I

The synthetic skin formulation was prepared by mixing the following ingredients:

| | |
|---|---|
| Comminuted raw poultry skin tissue | 87.7% |
| Sodium caseinate | 3.0 |
| Wheat flour | 3.0 |
| Sorbitol | 2.0 |
| Sodium Chloride | 1.8 |
| Carboxymethyl cellulose | 1.0 |
| Celery Salt | 1.0 |
| Sodium Phosphate | 0.5 |

A paste-like material was formed from the above mixture by combining 2 parts water to 3 parts formulated skin. The paste-like material was extruded onto the surface of a raw turkey roast. The cooked product displayed a natural-looking, well-browned, tasty, skin coating.

EXAMPLE II

A synthetic skin formulation was prepared by combining the following ingredients:

| | |
|---|---|
| Comminuted raw poultry skin tissue | 50% |
| 5% gelatin solution | 20 |
| Liquid egg whites | 13 |
| Nonfat milk solids | 11 |
| Wheat flour | 6 |

The above ingredients were mixed at a temperature of 120° F. The resulting synthetic formulation was applied to the surface of a raw turkey roast. This mixture resulted in a tasty, synthetic skin that remained intact on the roast during cooking.

EXAMPLE III

The following ingredients were mixed to form an artificial poultry skin formulation:

| | |
|---|---|
| Ground raw poultry skin tissue | 71% |
| Liquid egg white | 22 |
| Salt | 2 |
| Cornstarch | 1 |
| Potato flour | 1 |
| Methyl cellulose | 1 |
| Locust bean gum | 1 |
| Celery salt | 0.5 |
| Sodium phosphate | 0.5 |

The above formulation was blended with sufficient water to make a skin paste comprising 60 percent water and 40 percent synthetic skin formulation, and was applied to a raw turkey roast with a spatula. After roasting, the synthetic skin had a good color, and remained in place on the roast.

While the foregoing description has been primarily directed to the treatment of turkeys and chickens, it should be understood that the invention is also applicable to other fowl, such as ducks, geese, pheasants, etc.

Obviously, many modifications and variation of the invention as hereinbefore set forth may be made without departing from the spirit and scope thereof,

We claim:

1. A method of preparing an improved poultry product, said method comprising: removing the skin with adhering fat and flesh from poultry; comminuting the untrimmed poultry skin to a fine texture at a temperature below about 50°F.; formulating a synthetic poultry skin by mixing from about 50 percent to about 95 percent comminuted poultry skin tissue with from about 5 percent to about 50 percent of a binding material selected from the group consisting of sodium caseinate, cereals, gelatin, milk solids, liquid egg whites, flour, starches, comminuted meat protein, vegetable gums and mixtures thereof; blending the synthetic skin formulation with sufficient water to form a material having a paste-like consistency comprising from about 30 percent to about 100 percent skin formulation and from about 0 percent to about 70 percent water; and applying the paste-like synthetic skin material to the outside surface of a raw poultry product.

2. The method of claim 1 wherein the product is subsequently packaged and frozen.

3. The method of claim 2 wherein the untrimmed poultry skin is comminuted at a temperature of from about 28°F. to about 32°F.

4. The method of claim 3 wherein the synthetic skin formulation is prepared by mixing from about 70 percent to about 95 percent comminuted poultry skin tissue and from about 5 percent to about 30 percent binding material.

5. The method of claim 4 wherein the synthetic skin formulation is blended with sufficient water to give a skin paste comprising from about 40 percent to about 70 percent skin formulation and from about 30 percent to about 60 percent water.

6. The method of claim 5 wherein the skin paste is applied to the poultry product at a thickness of from about three thirty-seconds of an inch to about one-fourth of an inch.

7. The method of claim 6 wherein the poultry product is a turkey roast.

8. The method of claim 6 wherein the poultry product is a chicken roast.

9. The method of claim 6 wherein a food grade humectant is added to the skin formulation.

10. The method of claim 6 wherein an antioxidant is added to the synthetic skin formulation.

* * * * *